United States Patent [19]

Lewis

[11] 4,277,872

[45] Jul. 14, 1981

[54] TOOL FOR INSTALLATION AND REMOVAL RETAINING CLIPS

[76] Inventor: Joe Lewis, 3460 W. Tulane Dr., Kenner, La. 70062

[21] Appl. No.: 103,284

[22] Filed: Dec. 13, 1979

[51] Int. Cl.[3] .............................................. B23P 19/04

[52] U.S. Cl. .................................. 29/229; 29/243.56; 29/278

[58] Field of Search ..................... 29/235, 243.56, 225, 29/229, 278; 254/28; 81/3 R

[56] References Cited

U.S. PATENT DOCUMENTS

| | | | |
|---|---|---|---|
| 2,491,860 | 12/1949 | Ingraham | 81/3 R |
| 2,807,077 | 9/1957 | Alsdorf | 29/225 |
| 4,049,236 | 9/1977 | Grill et al. | 254/28 |

*Primary Examiner*—Robert C. Watson

[57] ABSTRACT

This tool is for the placement and removal of "E" type, and hairpin type, clips, that are used on mechanical devices, such as carburetors on gasoline engines. It consists primarily of a handle with a shank having a pair of magnetic blades, one of which includes a tooth for removing a clip from linkage.

1 Claim, 6 Drawing Figures

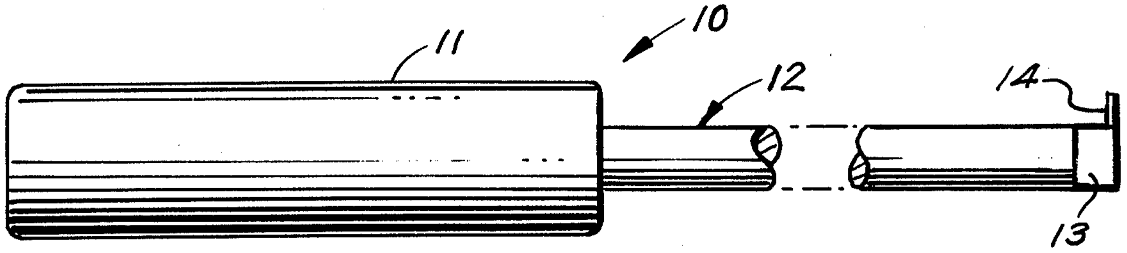
FIG. 1
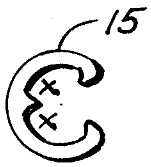
FIG. 2
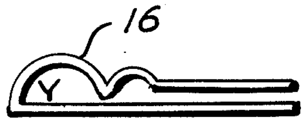
FIG. 3
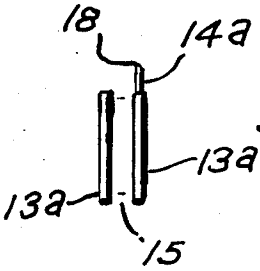
FIG. 5
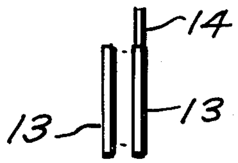
FIG. 4
FIG. 6
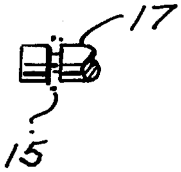

TOOL FOR INSTALLATION AND REMOVAL RETAINING CLIPS

This invention relates to hand tools, and more particularly, to a tool for installation and removal of retaining clips.

It is, therefore, the principal object of this invention to provide a tool for installation and removal of retaining clips, which will be adaptable for "E"-shaped and hairpin clips, that are generally used on carburetors of internal combustion engines, etc.

Another object of this invention is to provide a tool for installation and removal of retaining clips, which will be unique and novel, in that it will quickly place or remove metal clips that are received on linkage.

A further object of this invention is to provide a tool for installation and removal of retaining clips, which will have magnetic blades for magnetic attraction of the clips, and the tool will be adaptable for use in hard-to-reach areas, where linkage is placed.

Other objects are to provide a tool for installation and removal of retaining clips which is simple in design, inexpensive to manufacture, rugged in construction, easy to use, and efficient in operation.

These, and other objects, will be readily evident, upon a study of the following specification, and the accompanying drawing, wherein:

FIG. 1 is an enlarged plan view of the present invention;

FIG. 2 is a plan view of a retaining clip, that is placed on and removed from linkage, by the tool of FIG. 1;

FIG. 3 is a plan view of another design of clip, for which the invention may be used;

FIG. 4 is a fragmentary front view of FIG. 1;

FIG. 5 is a fragmentary front view, showing a modified form of the invention, and FIG. 6 is a fragmentary plan view, showing a link rod with a clip thereon, shown in phantom.

According to this invention, a tool 10 is shown to include a typical handle 11, having a shank 12 of metal therein. The end of shank 12 includes a pair of spaced apart metal blades 13, which are magnetic, and integral of shank 12.

In use, metal "E"-shaped clip 15, having arcuate openings "X", is placed between blades 13, where it is held by magnetic force, and is then placed on a link rod, as is shown in FIG. 6. When it is desired to remove clip 15, the tooth 14 of one of blades 13 is used, to dislodge clip 15 from the link rod 17. The hair pin clip 16, having the opening "Y", is placed or removed from link rod 17, in the same aforementioned manner as that of clip 15.

In FIG. 5, a modified form of blades 13*a* includes a tooth 14*a*, having a point 18, for use in removing clips 15 or 16.

While various changes may be made in the detail construction, it is understood that such changes will be within the spirit and scope of the present invention, as is defined by the appended claims.

What I now claim is:

1. A tool for installation and removal of retaining clips, comprising, in combination, a straight shank having a handle on one end thereof, and a pair of spaced-apart blades on its opposite end, said blades being magnetized, a tooth on one said blade, said tooth projecting from a side edge of said blade in a direction that is at right angles to a longitudinal axis of said shank, and an end of said tooth being pointed.

* * * * *